United States Patent
Shastry et al.

(12)

(10) Patent No.: US 11,361,170 B1
(45) Date of Patent: Jun. 14, 2022

(54) APPARATUS AND METHOD FOR ACCURATE TRANSLATION REVIEWS AND CONSISTENCY ACROSS MULTIPLE TRANSLATORS

(71) Applicant: Lilt, Inc., Stanford, CA (US)

(72) Inventors: Aditya Shastry, Stanford, CA (US); Spence Green, Stanford, CA (US); Joern Wuebker, Stanford, CA (US); Geza Kovacs, Stanford, CA (US); Jessy Lin, Stanford, CA (US); John DeNero, Stanford, CA (US)

(73) Assignee: LILT, INC., Stanford, CA (US)

( * ) Notice: Subject to any disclaimer, the term of this patent is extended or adjusted under 35 U.S.C. 154(b) by 265 days.

(21) Appl. No.: 16/744,673

(22) Filed: Jan. 16, 2020

Related U.S. Application Data

(60) Provisional application No. 62/794,259, filed on Jan. 18, 2019.

(51) Int. Cl.
| | |
|---|---|
| G06F 40/58 | (2020.01) |
| G06N 3/08 | (2006.01) |
| G06N 3/04 | (2006.01) |
| G06N 3/10 | (2006.01) |

(52) U.S. Cl.
CPC .............. *G06F 40/58* (2020.01); *G06N 3/08* (2013.01); *G06N 3/04* (2013.01); *G06N 3/10* (2013.01)

(58) Field of Classification Search
None
See application file for complete search history.

(56) References Cited

U.S. PATENT DOCUMENTS

| | | | |
|---|---|---|---|
| 8,494,837 B2 * | 7/2013 | Gao | G06F 40/44 704/7 |
| 8,676,563 B2 * | 3/2014 | Soricut | G06F 40/58 704/2 |
| 9,323,747 B2 * | 4/2016 | Anisimovich | G06F 40/58 |
| 10,248,651 B1 * | 4/2019 | Fuerstenau | G06F 40/166 |
| 2010/0076746 A1 * | 3/2010 | Aikawa | G06F 40/289 704/3 |
| 2010/0082324 A1 * | 4/2010 | Itagaki | G06F 40/47 704/2 |
| 2012/0123766 A1 * | 5/2012 | Anisimovich | G06F 40/58 704/3 |

(Continued)

*Primary Examiner* — Nafiz E Hoque
(74) *Attorney, Agent, or Firm* — Baker Botts, L.L.P.

(57) ABSTRACT

An apparatus has a network interface circuit to receive a source sentence from a network connected client device. A processor is connected to the network interface circuit. A memory is connected to the processor. The memory stores parameters of a multilingual neural review system and instructions executed by the processor to operate the multilingual neural review system trained on a corpus of source sentences, draft target sentences and corrected target sentences. The multilingual neural review system produces a corrected target sentence from a draft target sentence representing a proposed translation of the source sentence. The draft target sentence and the corrected target sentence are supplied to the network connected client device. Approval for the corrected target sentence is received from the network connected client device. Parameters of the multilingual neural review system are updated based upon the approval for the corrected target sentence.

16 Claims, 3 Drawing Sheets

(56) References Cited

U.S. PATENT DOCUMENTS

2017/0286376 A1* 10/2017 Mugan ................. G06N 3/0454
2018/0011843 A1* 1/2018 Lee ........................ G10L 15/02
2019/0354593 A1* 11/2019 Rojas ..................... G06F 40/47

* cited by examiner

APPARATUS AND METHOD FOR ACCURATE TRANSLATION REVIEWS AND CONSISTENCY ACROSS MULTIPLE TRANSLATORS

CROSS-REFERENCE TO RELATED APPLICATION

This application claims priority to U.S. Provisional Patent Application Ser. No. 62/794,259, the contents of which are incorporated herein by reference.

FIELD OF THE INVENTION

This invention relates generally to computer-assisted translation from a source language to one or more target languages. More particularly, this invention is directed toward the process of reviewing translations for accuracy and consistency.

BACKGROUND OF THE INVENTION

Translations are typically produced in two steps. First, a translator authors an initial draft of the translation. Second, a reviewer corrects and refines that translation. There is an ongoing need to automate review tasks.

SUMMARY OF THE INVENTION

An apparatus has a network interface circuit to receive a source sentence from a network connected client device. A processor is connected to the network interface circuit. A memory is connected to the processor. The memory stores parameters of a multilingual neural review system and instructions executed by the processor to operate the multilingual neural review system trained on a corpus of source sentences, draft target sentences and corrected target sentences. The multilingual neural review system produces a corrected target sentence from a draft target sentence representing a proposed translation of the source sentence. The draft target sentence and the corrected target sentence are supplied to the network connected client device. Suggested corrections to the draft target sentence based on the corrected target sentence are displayed by the network connected client device. Approval for the corrected target sentence is received from the network connected client device. Parameters of the multilingual neural review system are updated based upon the approval for the corrected target sentence.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
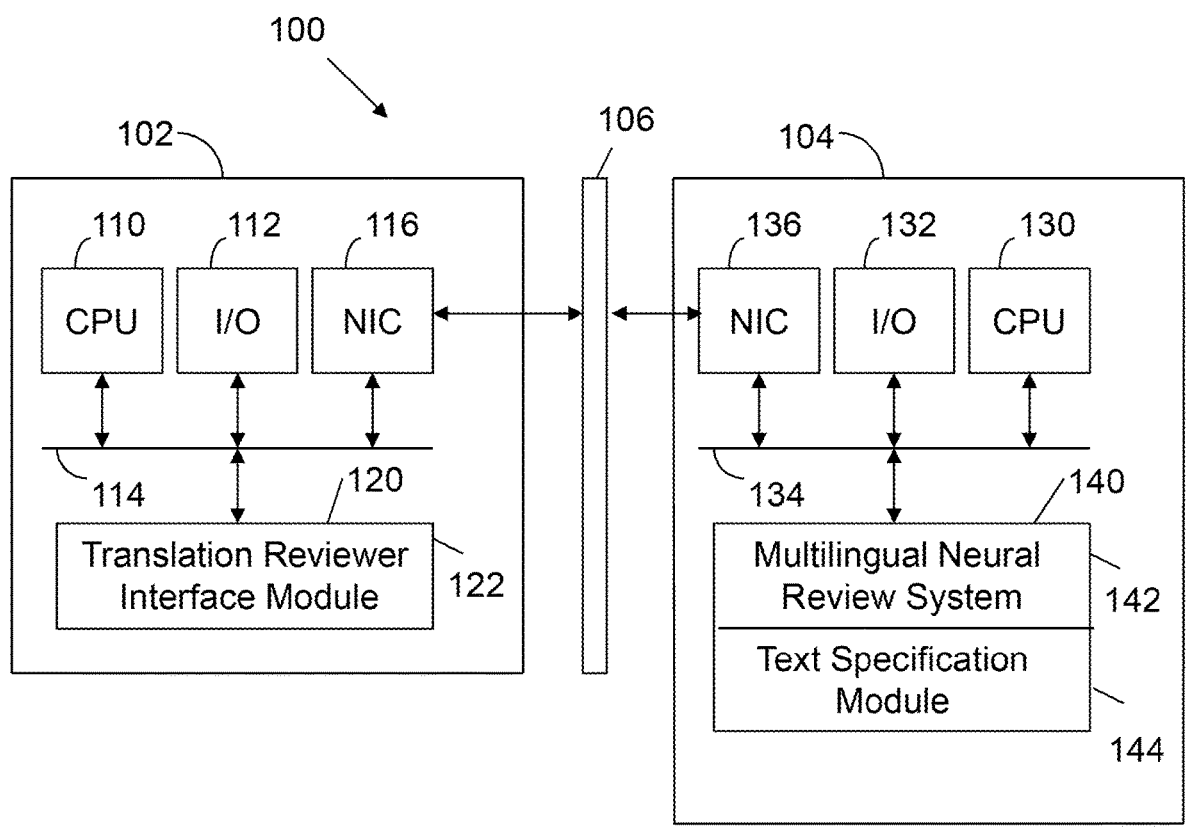
FIG. 1 illustrates a system configured in accordance with an embodiment of the invention.

FIG. 1 illustrates a system 100 configured in accordance with an embodiment of the invention. The system 100 includes a client device 102 in communication with a server 104 via a network 106, which may be any combination of wired and wireless networks.

Client device 102 may be a computer, tablet, smartphone and the like. The client device 102 includes a processor (e.g., a Central Processing Unit or CPU) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory stores a translation reviewer interface module 122, which includes instructions executed by processor 110. The translation reviewer interface module 122 includes instructions to communicate with server 104 to obtain an interface that accepts source language sentences and corresponding target language translations, as discussed in connection with FIG. 2.

Server 104 includes a processor 130, input/output devices 132, a bus 134 and a network interface circuit 136. A memory 140 is connected to bus 134. The memory 140 stores instructions to implement operations associated with the invention. In particular, the memory 140 stores the parameters of a multilingual neural review system 142, the operations of which are discussed in detail below. The memory 140 also stores a text specification module 144 with instructions executed by the processor 130 to communicate to the client device a proposed corrected target sentence for the draft target sentence.

Figure 2:
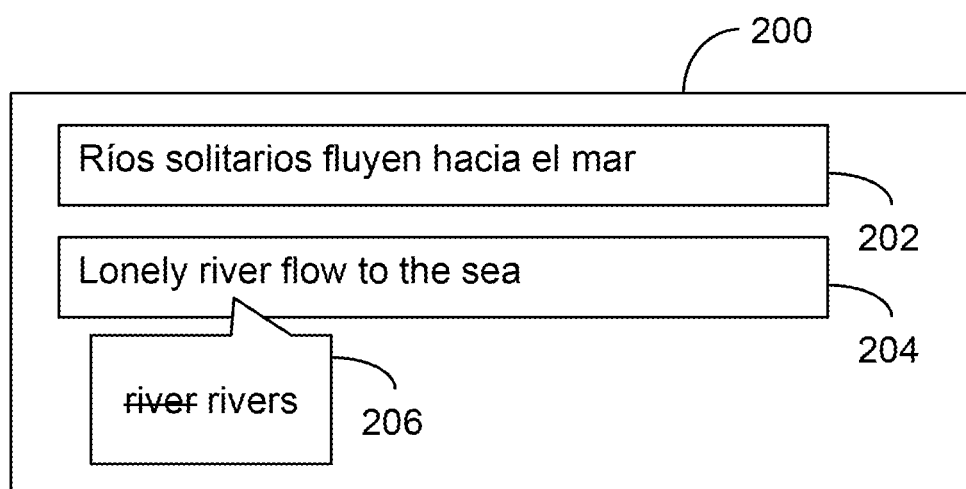
FIG. 2 illustrates a user interface that may be utilized in accordance with embodiments of the invention.

FIG. 2 illustrates an interface 200 that may be used in accordance with an embodiment of the invention. For example, the interface 200 is supplied by the server 104 for display on the client device 102. The interface 200 includes a text entry box 202 into which a user can type a source sentence, Spanish in this example, as well as a text entry box 204 into which a user can type a draft translation. Alternately, the text entry box 204 is populated with a draft target sentence by the multilingual neural review system 142.

A correction box 206 provides suggested corrections, which are generated from the corrected target sentence produced by the multilingual neural review system 142. The suggested corrections constitute a corrected target sentence. The multilingual neural review system 142 populates the correction box 206 with a correction in response to receiving the source sentence in the text entry box 202 and the draft target sentence in text entry box 204 (or producing the draft target sentence itself based upon the source sentence). When reviewing multiple sentences, each source sentence is entered into a different text entry box 202, each corresponding translation is entered into a corresponding text entry box 204, and a corrected target sentence is provided by the multilingual neural review system 142 in a corresponding correction box 206.

Figure 3:
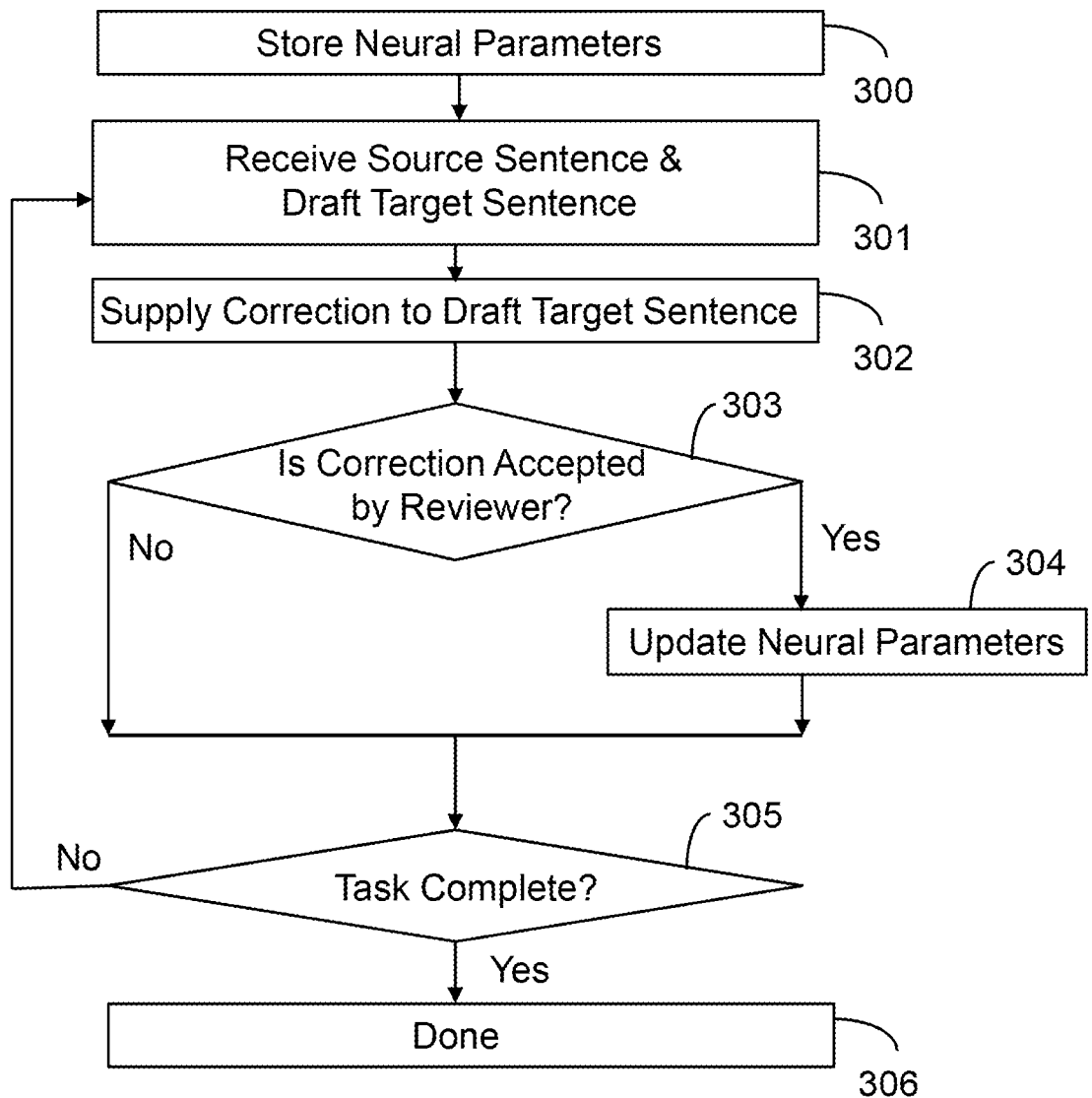
FIG. 3 illustrates processing operations performed in accordance with an embodiment of the invention.

FIG. 3 illustrates processing operations associated with an embodiment of the invention. Initially, parameters for a multilingual neural review system are stored 300. FIG. 1 illustrates the multilingual neural review system 142 stored in memory 140. Neural grammatical error correction is an approach to automatic error correction that uses a neural network to perform deep learning and representation learning. Characteristics of the multilingual neural review system 142 are detailed below.

The multilingual neural review system 142 is implemented using a neural network whose model parameters are stored in memory 140. The neural network consumes the source sentence and a draft target sentence, which is a proposed translation of the source sentence produced either by a user at client device 102 or by server 104.

The neural network produces a corrected target sentence from the draft target sentence. The source sentence is represented as a sequence of words $S=s_1s_2 \ldots s_m$, the draft target sentence is similarly represented as $T=t_1t_2 \ldots t_n$, and the corrected target sentence is similarly represented as $C=c_1c_2 \ldots c_k$ where m, n, and k are respectively the number of words in the source, the draft, and the corrected target sentences. The neural network can be comprised of distinct subnetworks—encoders and decoder, which are detailed below.

The neural network can be comprised of multiple encoders, each of which takes the responsibility of transforming the input sequence into a sequence of hidden states in a real-valued embedded space: $f_{enc}(x)=h=h_1h_2 \ldots h_x$, where x represents the number of elements in the input sequence, which corresponds to the number of hidden states. The elements can be words, characters, punctuation, or pieces of words. Given that there are two distinct input sequences for the network, the following configurations of encoders in the network are possible:

1) Single Encoder: A single encoder transforms the input sequences merged into a single sequence.
2) Bi-Encoder: Each of the two input sequences are transformed by a separate encoder. The separate encoders can either be identical or be distinct from one another.

The decision for the style of encoder, for example a Transformer or a Recurrent Neural Network with Attention, or the choice of using the single or Bi-Encoder implementation is taken on a case-by-case basis.

The decoder subnetwork computes the probability of the corrected target sequence, C, conditioned on both the input sequences S and T. The computation is performed in accordance with the chain rule of probability as a product of the probabilities of individual elements, $c_i$, of the sequence. The decoder factorizes the prediction probability as detailed below:

$$f_{dec}(C,h)=p(C|S,T)=\Pi^k_{i=1}p(c_i|c<_i,d_i,v_i)$$

1) The index i represents current time step for the decoder
2) $d_i$ represents decoders hidden state at the current time step
3) $v_i$ represents the context vector at the current time step
4) $c<_i$ denotes all elements of the sequence before element i.

The context vector is computed using an attention function, $f_{att}$, over the encoder hidden states as detailed below:

$$a'_{ij}=f_{att}(d_i,h_i) \text{ where } a'_{ij} \text{ represents the raw attention}$$

$$a_{ij}=a'_{ij}/\Sigma_j a'_{ij} \text{ where } a_{ij} \text{ represents the attention probability}$$

$$v_i=\Sigma_j a_{ij} h_j \text{ where } v_i \text{ represents the context vector}$$

To maintain consistency between the draft and the corrected target sentences, a copy context vector can be used in the prediction as $f_{dec}(C, h)=p(C|S, T)\Pi^k_{i=1} p(c_i|c<_i, d_i, v_i, cv_i)$. The copy context vector, $cv_i$, is computed in a similar way to $v_i$, but the hidden states, $h_i$, corresponding to source sequence elements, $s_i$, are masked, in which case the attention, $a'_{ij}$, is computed only over the hidden states corresponding to draft target sequence, $t_i$. This enables a mechanism to copy certain words from the draft target into the corrected target.

The decoder finally constructs a corrected target sequence comprised of elements corresponding to the maximum probability in each decoder time step or another inference objective function.

The foregoing represents operations 301 and 302 in FIG. 3. More particularly, for block 301, the multilingual neural review system 142 receives a source sentence, for example, from block 202 of interface 200. It also receives a draft target sentence either from the user populating block 204 or the draft target sentence is received or formed by the multilingual neural review system 142. A corrected target sentence for the draft target sentence is produced by the multilingual review system 142.

The multilingual review system 142 may incorporate other information, such as a text specification that describes how certain parts of the translation should be expressed or formatted, such as the format of dates, addresses, numbers, currencies, titles, names, or specific terminology. The text specification and any information relevant to generating a corrected target sentence are stored in the text specification module 144. Formatting and substitution rules from the text specification module 144 can be integrated into the corrected target sentence either as additional inputs to the multilingual review system 142, constraints on the output of the multilingual review system 142, or rule-based changes applied to the text of either the draft target sentence or the corrected target sentence. The corrected target sentence is supplied 302 to the client device 102.

A corrected target sentence can be displayed directly or alternatively displayed as one or more suggested corrections to the draft target sentence, such as shown with block 206 of interface 200. Suggested corrections can be generated by comparing the draft target sentence to the corrected target sentence, for example by using a minimum edit distance algorithm to find the smallest corrections that would yield the corrected target sentence when applied to the draft target sentence. Suggested corrections may be displayed as part of the draft target sentence, as correction boxes, or as comments describing suggested changes to the draft target sentence. In one embodiment, the process of inferring suggested corrections from the corrected target sentence and displaying them to the user in a suitable format is executed by the translation reviewer interface module 122.

In the event that the user approves the corrected target sentence (303—Yes), the neural review system updates its model parameters 304. The reviewer may generate this corrected target sentence by accepting suggestions from the system or by performing additional edits to arrive at the correct target translation for the source sentence.

When a correct sequence of edits is not received (303—No) and after the model parameters are updated 304, a check is made to determine whether the task is complete 305. If so (305—Yes), processing is complete. If not (305—No), control returns to block 301.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
    a network interface circuit to receive a source sentence and a draft target sentence entered from a network connected client device;
    a processor connected to the network interface circuit; and
    a memory connected to the processor, the memory storing parameters of a multilingual neural review system comprising a neural network and instructions executed by the processor to:
        operate the multilingual neural review system that has been trained on a corpus of source sentences, draft target sentences and corrected target sentences, such that the multilingual neural review system:
            produces a corrected target sentence from the draft target sentence representing a proposed translation of the source sentence,
            supplies the corrected target sentence to the network connected client device,
            receives approval for the corrected target sentence from the network connected client device, and
            updates parameters of the multilingual neural review system based upon the approval for the corrected target sentence.

2. The apparatus of claim 1 wherein the neural network includes an encoder to transform one or more input sequences representing the source sentence and draft target sentence into a hidden state sequence in a real-valued embedded space.

3. The apparatus of claim 2 wherein the encoder is a single encoder.

4. The apparatus of claim 2 wherein the encoder is a bi-encoder.

5. The apparatus of claim 2 wherein the encoder is a Recurrent Neural Network.

6. The apparatus of claim 1 wherein the neural network includes a decoder to compute a probability associated with the corrected target sentence.

7. The apparatus of claim 6 wherein the probability is derived from a chain rule of probability.

8. The apparatus of claim 6 wherein the decoder computes a context vector using an attention function.

9. The apparatus of claim 6 wherein the decoder computes a copy context vector.

10. The apparatus of claim 1 wherein the multilingual neural review system utilizes formatting rules specifying how the corrected target sentence should be formatted.

11. The apparatus of claim 10 wherein the formatting rules include date formatting rules.

12. The apparatus of claim 10 wherein the formatting rules include address formatting rules.

13. The apparatus of claim 10 wherein the formatting rules include number formatting rules.

14. The apparatus of claim 10 wherein the formatting rules include currency formatting rules.

15. The apparatus of claim 10 wherein the formatting rules include title formatting rules.

16. The apparatus of claim 10 wherein the formatting rules include name formatting rules.

* * * * *